United States Patent
Neill et al.

(10) Patent No.: US 9,273,206 B2
(45) Date of Patent: Mar. 1, 2016

(54) TERNARY BLENDS OF TEREPHTHALATE OR ISOPHTHALATE POLYESTERS CONTAINING EG, CHDM AND TMCD

(71) Applicant: Eastman Chemical Company, Kingsport, TN (US)

(72) Inventors: Ryan Thomas Neill, Kingsport, TN (US); Douglas Stephens McWilliams, Piney Flats, TN (US)

(73) Assignee: Eastman Chemical Company, Kingsport, TN (US)

( * ) Notice: Subject to any disclaimer, the term of this patent is extended or adjusted under 35 U.S.C. 154(b) by 228 days.

(21) Appl. No.: 13/924,853

(22) Filed: Jun. 24, 2013

(65) Prior Publication Data

US 2014/0010982 A1    Jan. 9, 2014

Related U.S. Application Data

(60) Provisional application No. 61/669,331, filed on Jul. 9, 2012.

(51) Int. Cl.
*C08L 67/02*   (2006.01)

(52) U.S. Cl.
CPC ............ *C08L 67/02* (2013.01); *C08L 2205/03* (2013.01); *Y10T 428/139* (2015.01); *Y10T 428/1397* (2015.01)

(58) Field of Classification Search
None
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 3,249,652 A | 5/1966 | Quisenberry | |
| 3,864,428 A | 2/1975 | Nakamura et al. | |
| 4,096,202 A | 6/1978 | Farnham et al. | |
| 4,200,567 A | 4/1980 | Goldman et al. | |
| 4,263,364 A | 4/1981 | Seymour et al. | |
| 4,485,212 A | 11/1984 | Wefer | |
| 4,493,921 A | 1/1985 | Wefer | |
| 4,550,138 A | 10/1985 | Paddock et al. | |
| 5,382,628 A | 1/1995 | Stewart et al. | |
| 5,498,688 A | 3/1996 | Oshino et al. | |
| 5,654,347 A | 8/1997 | Khemani et al. | |
| 5,696,176 A | 12/1997 | Khemani et al. | |
| 5,705,575 A | 1/1998 | Kelsey | |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 7,425,590 B2 | 9/2008 | Hale | |
| 7,462,684 B2 | 12/2008 | Hale et al. | |
| 7,510,768 B2 | 3/2009 | Crawford et al. | |
| 7,576,171 B2 | 8/2009 | Crawford et al. | |
| 7,704,605 B2 | 4/2010 | Crawford et al. | |
| 7,737,246 B2 | 6/2010 | Crawford | |
| 7,740,941 B2 | 6/2010 | Crawford et al. | |
| 7,781,562 B2 | 8/2010 | Crawford et al. | |
| 7,803,439 B2 | 9/2010 | Crawford et al. | |
| 7,803,440 B2 | 9/2010 | Crawford et al. | |
| 7,803,441 B2 | 9/2010 | Crawford et al. | |
| 7,807,774 B2 | 10/2010 | Crawford et al. | |
| 7,807,775 B2 | 10/2010 | Crawford et al. | |
| 7,812,111 B2 | 10/2010 | Crawford et al. | |
| 7,812,112 B2 | 10/2010 | Crawford et al. | |
| 7,834,129 B2 | 11/2010 | Crawford et al. | |
| 7,838,620 B2 | 11/2010 | Crawford et al. | |
| 7,842,776 B2 | 11/2010 | Crawford et al. | |
| 7,855,267 B2 | 12/2010 | Crawford et al. | |
| 7,868,128 B2 | 1/2011 | Crawford et al. | |
| 7,893,187 B2 | 2/2011 | Crawford et al. | |
| 7,893,188 B2 | 2/2011 | Crawford et al. | |
| 7,902,320 B2 | 3/2011 | Crawford et al. | |
| 7,906,211 B2 | 3/2011 | Crawford et al. | |
| 7,906,212 B2 | 3/2011 | Crawford et al. | |
| 7,906,610 B2 | 3/2011 | Crawford et al. | |
| 7,915,376 B2 | 3/2011 | Crawford et al. | |
| 7,951,900 B2 | 5/2011 | Crawford et al. | |
| 7,955,674 B2 | 6/2011 | Hale et al. | |
| 7,959,836 B2 | 6/2011 | Hale et al. | |
| 7,959,998 B2 | 6/2011 | Hale et al. | |

(Continued)

FOREIGN PATENT DOCUMENTS

| | | | |
|---|---|---|---|
| DE | 1221323 | 7/1966 | |
| DE | 1694124 | 7/1971 | |
| EP | 0 169 947 | 2/1986 | |
| JP | 51 034 991 | 3/1976 | |
| WO | WO 9213033 A1 * | 8/1992 | ............ C08L 67/02 |

OTHER PUBLICATIONS

U.S. Appl. No. 12/254,894, filed Oct. 21, 2008, Gary Michael Stack et al.
U.S. Appl. No. 12/390,694, filed Feb. 23, 2009, Gary Michael Stack.
Porter, Roger, et al., "Compatibility and Transesterification in Binary Polymer Blends," Polymer 1992, pp. 2019-2030, vol. 33, #10.
Carrot, Christian, et al., "Immiscible Blends of PC and PET, Current Knowledge and New Results: Rheological Properties," Macromolecular Materials and Engineering, 2007, pp. 693-706, vol. 292.
Nabar, Sanket, et al., "Rheology and Transesterification between Polycarbonate and Polyesters," Journal of Applied Polymer Science, 2007, pp. 2039-2047, vol. 104.

(Continued)

*Primary Examiner* — Randy Gulakowski
*Assistant Examiner* — Christopher M Rodd
(74) *Attorney, Agent, or Firm* — Betty J. Boshears; Robert C. Morriss (57) ABSTRACT

Disclosed are ternary polyester blends that contain at least one polyester comprising terephthalic or isophthalic acid, ethylene glycol, and 1,4-cyclohexanedimethanol residues, and at least one polyester comprising terephthalic or isophthalic acid, 2,2,4,4-tetramethyl-1,3-cyclobutanediol, and 1,4-cyclohexanedimethanol residues. The ternary polyester blends have improved clarity, toughness, and fabrication characteristics and are useful for the preparation of flat or shaped articles. Of special interest are ternary blends where one of the three components compatibilizes the blend of two otherwise immiscible polyesters.

28 Claims, 2 Drawing Sheets

(56) References Cited

U.S. PATENT DOCUMENTS

| | | |
|---|---|---|
| 7,985,827 B2 | 7/2011 | Crawford et al. |
| 8,063,172 B2 | 11/2011 | Crawford |
| 8,063,173 B2 | 11/2011 | Crawford |
| 8,067,525 B2 | 11/2011 | Crawford |
| 8,101,705 B2 | 1/2012 | Crawford et al. |
| 8,119,761 B2 | 2/2012 | Crawford et al. |
| 8,119,762 B2 | 2/2012 | Crawford et al. |
| 8,133,967 B2 | 3/2012 | Pecorini et al. |
| 8,193,302 B2 | 6/2012 | Crawford et al. |
| 8,287,970 B2 | 10/2012 | Pecorini et al. |
| 8,299,204 B2 | 10/2012 | Germroth et al. |
| 8,354,491 B2 | 1/2013 | Crawford et al. |
| 2006/0226565 A1 | 10/2006 | Hale et al. |
| 2006/0228507 A1 | 10/2006 | Hale et al. |
| 2006/0234073 A1 | 10/2006 | Hale et al. |
| 2006/0235167 A1 | 10/2006 | Hale et al. |
| 2006/0247388 A1 | 11/2006 | Hale et al. |
| 2006/0286322 A1 | 12/2006 | Crawford et al. |
| 2006/0286326 A1 | 12/2006 | Crawford et al. |
| 2006/0286327 A1 | 12/2006 | Crawford et al. |
| 2006/0286328 A1 | 12/2006 | Crawford et al. |
| 2006/0286329 A1 | 12/2006 | Crawford et al. |
| 2006/0286330 A1 | 12/2006 | Crawford et al. |
| 2006/0286331 A1 | 12/2006 | Crawford et al. |
| 2006/0286384 A1 | 12/2006 | Crawford et al. |
| 2006/0286389 A1 | 12/2006 | Crawford et al. |
| 2006/0286394 A1 | 12/2006 | Crawford et al. |
| 2006/0287474 A1 | 12/2006 | Crawford et al. |
| 2006/0287476 A1 | 12/2006 | Crawford et al. |
| 2006/0287477 A1 | 12/2006 | Crawford et al. |
| 2006/0287478 A1 | 12/2006 | Crawford |
| 2006/0287479 A1 | 12/2006 | Crawford et al. |
| 2006/0287480 A1 | 12/2006 | Crawford |
| 2006/0287481 A1 | 12/2006 | Crawford et al. |
| 2006/0287482 A1 | 12/2006 | Crawford et al. |
| 2006/0287483 A1 | 12/2006 | Crawford et al. |
| 2006/0287484 A1 | 12/2006 | Crawford et al. |
| 2006/0287485 A1 | 12/2006 | Crawford et al. |
| 2006/0287486 A1 | 12/2006 | Crawford et al. |
| 2006/0287487 A1 | 12/2006 | Crawford et al. |
| 2006/0287488 A1 | 12/2006 | Crawford et al. |
| 2006/0287489 A1 | 12/2006 | Crawford et al. |
| 2006/0287490 A1 | 12/2006 | Crawford et al. |
| 2006/0287491 A1 | 12/2006 | Crawford et al. |
| 2006/0287492 A1 | 12/2006 | Crawford et al. |
| 2006/0287493 A1 | 12/2006 | Crawford et al. |
| 2006/0287494 A1 | 12/2006 | Crawford |
| 2006/0287495 A1 | 12/2006 | Crawford et al. |
| 2006/0287496 A1 | 12/2006 | Crawford et al. |
| 2006/0293494 A1 | 12/2006 | Crawford et al. |
| 2006/0293495 A1 | 12/2006 | Crawford et al. |
| 2007/0010649 A1 | 1/2007 | Crawford et al. |
| 2007/0100122 A1 | 5/2007 | Crawford et al. |
| 2007/0100125 A1 | 5/2007 | Crawford et al. |
| 2007/0105993 A1 | 5/2007 | Germroth et al. |
| 2007/0106054 A1 | 5/2007 | Crawford et al. |
| 2007/0129531 A1 | 6/2007 | Crawford et al. |
| 2007/0142511 A1 | 6/2007 | Crawford |
| 2007/0142615 A1 | 6/2007 | Crawford |
| 2007/0232778 A1 | 10/2007 | Moody et al. |
| 2007/0232779 A1 | 10/2007 | Moody et al. |
| 2007/0270569 A1 | 11/2007 | Crawford et al. |
| 2008/0293857 A1 | 11/2008 | Crawford et al. |
| 2008/0293882 A1 | 11/2008 | Germroth et al. |
| 2009/0093573 A1 | 4/2009 | Germroth et al. |
| 2009/0093574 A1 | 4/2009 | Crawford et al. |
| 2009/0130353 A1 | 5/2009 | Pecorini et al. |
| 2009/0137723 A1 | 5/2009 | Crawford et al. |
| 2009/0137735 A1 | 5/2009 | Crawford et al. |
| 2010/0087574 A1 | 4/2010 | Crawford et al. |
| 2010/0092705 A1 | 4/2010 | Crawford et al. |
| 2010/0096589 A1 | 4/2010 | Crawford et al. |
| 2010/0120979 A1 | 5/2010 | Crawford |
| 2010/0159176 A1* | 6/2010 | Hale ................. C08L 67/02 428/36.9 |
| 2010/0174030 A1 | 7/2010 | Crawford et al. |
| 2010/0174033 A1 | 7/2010 | Crawford et al. |
| 2010/0174034 A1 | 7/2010 | Crawford et al. |
| 2010/0184940 A1 | 7/2010 | Germroth et al. |
| 2010/0227971 A1 | 9/2010 | Crawford et al. |
| 2010/0249293 A1 | 9/2010 | Treece |
| 2010/0298523 A1 | 11/2010 | Germroth et al. |
| 2010/0300918 A1 | 12/2010 | Crawford et al. |
| 2011/0017751 A1 | 1/2011 | Pecorini et al. |
| 2011/0042338 A1 | 2/2011 | Pecorini et al. |
| 2011/0054091 A1 | 3/2011 | Crawford et al. |
| 2011/0108503 A1 | 5/2011 | Crawford et al. |
| 2011/0144266 A1 | 6/2011 | Crawford et al. |
| 2011/0146022 A1 | 6/2011 | Crawford et al. |
| 2011/0189415 A1 | 8/2011 | Crawford et al. |
| 2011/0306730 A1 | 12/2011 | Crawford et al. |
| 2012/0021158 A1 | 1/2012 | Crawford et al. |
| 2012/0108715 A1 | 5/2012 | Crawford et al. |
| 2012/0184668 A1 | 7/2012 | Stack et al. |
| 2012/0184669 A1 | 7/2012 | Hale |
| 2012/0184687 A1 | 7/2012 | Hale et al. |
| 2012/0322951 A1 | 12/2012 | Hale et al. |
| 2012/0328815 A1 | 12/2012 | Pecorini et al. |

OTHER PUBLICATIONS

Gregory, D.R., et al., "Errors That Result from Thermal Degradation During Shear Measurements on Some Molten Polymers," Polymer Engineering and Science, 1985, pp. 362-366, vol. 25.

Kelsey, Donald R., et al., "High Impact, Amorphous Terephthalate Copolyesters of Rigid 2,2,4,4-Tetramethyl-1,3-Cyclobutanediol with Flexible Diols," Macromolecules, 2000, pp. 5810-5818, vol. 33, American Chemical Society.

Notice of Allowance and Fee(s) Due mailing date Jan. 24, 2013 received in co-pending U.S. Appl. No. 13/215,511.

Notice of Allowance and Fee(s) Due mailing date Nov. 23, 2012 received in co-pending U.S. Appl. No. 13/348,677.

USPTO Office Action dated Dec. 7, 2012 for co-pending U.S. Appl. No. 13/398,262.

USPTO Office Action dated Apr. 23, 2013 for co-pending U.S. Appl. No. 13/097,722.

Notice of Allowance and Fee(s) Due mailing date Sep. 18, 2013 received in co-pending U.S. Appl. No. 13/097,696.

Notice of Allowance and Fee(s) Due mailing date Mar. 11, 2014 received in co-pending U.S. Appl. No. 12/728,565.

Notification of Transmittal of the International Search Report and the Written Opinion of the International Searching Authority, or the Declaration date of mailing Aug. 22, 2013 for International Application No. PCT/US2013/048861.

* cited by examiner

TERNARY BLENDS OF TEREPHTHALATE OR ISOPHTHALATE POLYESTERS CONTAINING EG, CHDM AND TMCD

CROSS-REFERENCE TO RELATED APPLICATION

This application claims the benefit of the filing date of U.S. Provisional Patent Application No. 61/669,331, filed on Jul. 9, 2012; the entire content of which is hereby incorporated by reference.

FIELD OF THE INVENTION

The invention relates to the field of terephthalate or isophthalate-based polyesters and, in particular, to blends of terephthate or isophthalate-based polyesters containing ethylene glycol (EG), 1,4-cyclohexanedimethanol (CHDM), with terephthalate or isophthalate-based polyesters containing TMCD and CHDM.

BACKGROUND OF THE INVENTION

A wide range of polyesters with varying properties are commercially available. It can also be advantageous to blend polyesters together in order to develop new materials that take advantage of the properties of the specific components used in the blend. One example is using a PETG copolyester (which contains terephthalic acid (TPA), EG, and CHDM) in blends to improve properties such as lowering viscosity for extrusion processing, increasing adhesion for lamination processing, and altering the heat distortion temperature. Unfortunately, the PETG copolyester is generally not miscible with some other copolyesters such as a PCTT copolyester (which contains TPA, CHDM, and TMCD). Because they are generally immiscible and have different refractive indices, blends of PETG and PCTT typically exhibit an unacceptable level of haze in an extruded film.

Thus, there is a need in the art for polyester blends containing PETG and PCTT that exhibit an acceptable level of haze.

The present invention addresses this need in the art as well as others that will become apparent from the following description and the appended claims.

SUMMARY OF THE INVENTION

Briefly, the present invention provides a ternary polyester blend.

In one embodiment, the polyester blend comprises:
(a) a polyester (PCTT) comprising:
  (i) a diacid component comprising at least 95 mole percent of the residues of terephthalic acid, isophthalic acid, or mixtures thereof; and
  (ii) a diol component comprising from 15 to 45 mole percent of the residues of 2,2,4,4-tetramethyl-1,3-cyclobutanediol and from 55 to 85 mole percent of the residues of 1,4-cyclohexanedimethanol;
(b) a polyester (PETG) comprising:
  (i) a diacid component comprising at least 95 mole percent of the residues of terephthalic acid, isophthalic acid, or mixtures thereof; and
  (ii) a diol component comprising from 25 to 55 mole percent of the residues of 1,4-cyclohexanedimethanol and from 45 to 75 mole percent of the residues of ethylene glycol; and
(c) a polyester (PCTG) comprising:
  (i) a diacid component comprising at least 95 mole percent of the residues of terephthalic acid, isophthalic acid, or mixtures thereof; and
  (ii) a diol component comprising from 55 to 85 mole percent of the residues of 1,4-cyclohexanedimethanol and from 15 to 45 mole percent of the residues of ethylene glycol,
wherein the blend has a haze value of 5% or less when measured on a 0.010-inch thick film.

In another embodiment, the blend comprises the polyesters PCTT, PETG, and PCTG in an amount sufficient to satisfy equations (1a) or (1b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0.41 \quad (1a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 1.22 \quad (1b)$$

wherein X is the weight percent of the polyester PCTT, Y is the weight percent of the polyester PETG, and Z is the weight percent of the polyester PCTG in the polyester blend.

In yet another embodiment, the polyester blend comprises:
(a) from 50 to 80 weight percent of a polyester (PCTT) comprising:
  (i) a diacid component comprising at least 95 mole percent of the residues of terephthalic acid; and
  (ii) a diol component comprising from 15 to 40 mole percent of the residues of 2,2,4,4-tetramethyl-1,3-cyclobutanediol and from 60 to 85 mole percent of the residues of 1,4-cyclohexanedimethanol;
(b) from 5 to 15 weight percent of a polyester (PETG) comprising:
  (i) a diacid component comprising at least 95 mole percent of the residues of terephthalic acid; and
  (ii) a diol component comprising from 25 to 35 mole percent of the residues of 1,4-cyclohexanedimethanol and from 65 to 75 mole percent of the residues of ethylene glycol; and
(c) from 15 to 45 weight percent of a polyester (PCTG) comprising:
  (i) a diacid component comprising at least 95 mole percent of the residues of terephthalic acid; and
  (ii) a diol component comprising from 50 to 85 mole percent of the residues of 1,4-cyclohexanedimethanol and from 15 to 50 mole percent of the residues of ethylene glycol,
wherein the weight percentages are based on the total amount of the polyesters PCTT, PETG, and PCTG in the blend, and the sum of the weight percentages equals 100, and
wherein the blend has a haze value of 1.5% or less when measured on a 0.010-inch thick film.

In yet another embodiment, the polyester blend comprises:
(a) 40 to 90 weight percent of a polyester (PCTT) comprising:
  (i) a diacid component comprising at least 95 mole percent of the residues of terephthalic acid, isophthalic acid, or mixtures thereof; and
  (ii) a diol component comprising from 15 to 45 mole percent of the residues of 2,2,4,4-tetramethyl-1,3-cyclobutanediol and from 55 to 85 mole percent of the residues of 1,4-cyclohexanedimethanol;

(b) 1 to 20 weight percent of a polyester (PETG) comprising:
  (i) a diacid component comprising at least 95 mole percent of the residues of terephthalic acid, isophthalic acid, or mixtures thereof; and
  (ii) a diol component comprising from 25 to 55 mole percent of the residues of 1,4-cyclohexanedimethanol and from 45 to 75 mole percent of the residues of ethylene glycol; and
(c) 10 to 50 weight percent of a polyester (PCTG) comprising:
  (i) a diacid component comprising at least 95 mole percent of the residues of terephthalic acid, isophthalic acid, or mixtures thereof; and
  (ii) a diol component comprising from 55 to 85 mole percent of the residues of 1,4-cyclohexanedimethanol and from 15 to 45 mole percent of the residues of ethylene glycol,
  wherein the weight percentages are based on the total amount of the polyesters PCTT, PETG, and PCTG in the blend, and the sum of the weight percentages equals 100.

The polyester blends can be readily prepared by melt blending the three polyester components. The blends of the invention are useful for the preparation of various shaped articles such as, for example, films, sheets, fibers, tubes, preforms, containers, bottles, and thermoformed articles. These articles can be prepared by methods well-known in the art including, but not limited to, extrusion, calendering, thermoforming, blow-molding, extrusion blow-molding, injection molding, injection blow-molding, injection stretch blow-molding, compression molding, profile extrusion, cast extrusion, melt-spinning, drafting, tentering, and blowing.

DETAILED DESCRIPTION OF THE INVENTION

It has been surprisingly discovered that the miscibility (and resulting haze) of blends of PETG and PCTT can be improved by a factor of about 3.5 by using resin grades with lower inherent viscosities. It has been further surprisingly discovered that a PCTG copolyester (containing TPA, CHDM, and EG), which is separately miscible in binary combinations with either PETG or PCTT, can act as a compatabilizer between the PCTT and PETG at certain ternary loading levels to improve properties, such as significantly lowering haze.

Thus, in one aspect, the present invention provides ternary polyester blends comprising PCTT, PETG, and PCTG. By "ternary," it is meant that the blends contain three or more of the polyester components. The blends are characterized at least by having low haze, such as a haze value of 5% or less, 3% or less, 1.5% or less, 1% or less, or 0.5% or less. In another embodiment, the haze value of the blend is 0 to 5%, 0 to 4%, 0 to 3%, 0 to 2%, 0 to 1%, or 0 to 0.5%.

In one embodiment, the polyester blend comprises:
(a) a polyester (PCTT) comprising:
  (i) a diacid component comprising at least 95 mole percent of the residues of terephthalic acid, isophthalic acid, or mixtures thereof; and
  (ii) a diol component comprising from 15 to 45 mole percent of the residues of 2,2,4,4-tetramethyl-1,3-cyclobutanediol and from 55 to 85 mole percent of the residues of 1,4-cyclohexanedimethanol;
(b) a polyester (PETG) comprising:
  (i) a diacid component comprising at least 95 mole percent of the residues of terephthalic acid, isophthalic acid, or mixtures thereof; and
  (ii) a diol component comprising from 25 to 55 mole percent of the residues of 1,4-cyclohexanedimethanol and from 45 to 75 mole percent of the residues of ethylene glycol; and
(c) a polyester (PCTG) comprising:
  (i) a diacid component comprising at least 95 mole percent of the residues of terephthalic acid, isophthalic acid, or mixtures thereof; and
  (ii) a diol component comprising from 55 to 85 mole percent of the residues of 1,4-cyclohexanedimethanol and from 15 to 45 mole percent of the residues of ethylene glycol,
  wherein the blend has a haze value of 5% or less when measured on a 0.010-inch thick film.

In another embodiment, the blend can have a haze value of 3% or less, 1.5% or less, 1% or less, or even 0.5% or less when measured on a 0.010-inch thick film. In another embodiment, the blend can have a haze value of 0 to 5%, 0 to 4%, 0 to 3%, 0 to 2%, 0 to 1.5%, 0 to 1%, or 0 to 0.5% when measured on a 0.010-inch thick film. In another embodiment, the blend can have a haze value of 0.5 to 5%, 0.5 to 4%, 0.5 to 3%, 0.5 to 2%, 0.5 to 1.5%, 0.5 to 1%, when measured on a 0.010-inch thick film. In another embodiment, the blend can have a haze value of 1 to 5%, 1 to 4%, 1 to 3%, 1 to 2% when measured on a 0.010-inch thick film. In another embodiment, the blend can have a haze value of 1.5 to 5%, 1.5 to 4%, 1.5 to 3% when measured on a 0.010-inch thick film. In another embodiment, the blend can have a haze value of 2 to 5%, 2 to 4%, 2 to 3% when measured on a 0.010-inch thick film. In another embodiment, the blend can have a haze value of 2.5 to 5%, 2.5 to 4 when measured on a 0.010-inch thick film. In another embodiment, the blend can have a haze value of 2.5 to 5%, 2.5 to 4% when measured on a 0.010-inch thick film. In another embodiment, the blend can have a haze value of 3 to 5% or 3 to 4% when measured on a 0.010-inch thick film.

In yet another embodiment, the polyesters PCTT, PETG, and PCTG are present in the blend in an amount sufficient to satisfy equations (1a) or (1b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0.41 \quad (1a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 1.22 \quad (1b)$$

wherein X is the weight percent of the polyester PCTT, Y is the weight percent of the polyester PETG, and Z is the weight percent of the polyester PCTG in the polyester blend.

In one embodiment, the polyester blends satisfying equations (1a) or (1b) generally can have a haze value of 1.5% or less.

In yet another embodiment, the polyesters PCTT, PETG, and PCTG are present in the blend in an amount sufficient to satisfy equations (2a) or (2b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0 \quad (2a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 1 \quad (2b)$$

wherein X is the weight percent of the polyester PCTT, Y is the weight percent of the polyester PETG, and Z is the weight percent of the polyester PCTG in the polyester blend.

In another embodiment, polyester blends satisfying equations (2a) or (2b) generally can have a haze value of 1.0% or less.

In yet another embodiment, the polyesters PCTT, PETG, and PCTG are present in the blend in an amount sufficient to satisfy equations (3a) or (3b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0.7 \quad (3a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 0.7 \quad (3b)$$

wherein X is the weight percent of the polyester PCTT, Y is the weight percent of the polyester PETG, and Z is the weight percent of the polyester PCTG in the polyester blend.

In another embodiment, polyester blends satisfying equations (3a) or (3b) generally can have a haze value of 0.5% or less.

Equations (1a), (2a), and (3a) are generally more suited for lower inherent viscosity polyesters (0.67 dL/g or less), and equations (1b), (2b), and (3b) are generally more suited for higher inherent viscosity (above 0.67 dL/g) polyesters.

In one particular embodiment, the polyester blend of the invention comprises:
(a) 40 to 90 weight percent of a polyester (PCTT) comprising:
  (i) a diacid component comprising at least 95 mole percent of the residues of terephthalic acid, isophthalic acid, or mixtures thereof; and
  (ii) a diol component comprising from 15 to 45 mole percent of the residues of 2,2,4,4-tetramethyl-1,3-cyclobutanediol and from 55 to 85 mole percent of the residues of 1,4-cyclohexanedimethanol;
(b) 1 to 20 weight percent of a polyester (PETG) comprising:
  (i) a diacid component comprising at least 95 mole percent of the residues of terephthalic acid, isophthalic acid, or mixtures thereof; and
  (ii) a diol component comprising from 25 to 55 mole percent of the residues of 1,4-cyclohexanedimethanol and from 45 to 75 mole percent of the residues of ethylene glycol; and
(c) 10 to 50 weight percent of a polyester (PCTG) comprising:
  (i) a diacid component comprising at least 95 mole percent of the residues of terephthalic acid, isophthalic acid, or mixtures thereof; and
  (ii) a diol component comprising from 55 to 85 mole percent of the residues of 1,4-cyclohexanedimethanol and from 15 to 45 mole percent of the residues of ethylene glycol, wherein the weight percentages are based on the total amount of the polyesters PCTT, PETG, and PCTG in the blend, and the sum of the weight percentages equals 100.

The particular amounts of the individual polyesters PCTT, PETG, and PCTG in the blends may vary over a wide range based on the sum of the percentages of each of PCTT, PETG and PCTG equaling a total of 100 weight percent, and depending on the particular properties desired in the resulting blend including haze. As a general guidance, for example, the blends may contain from 25 to 90 weight percent of PCTT, from 5 to 25 weight percent of PETG, and from 5 to 50 weight percent of PCTG. The blends may also contain, for example, from 40 to 90 weight percent of PCTT, from 1 to 20 weight percent of PETG, and from 10 to 50 weight percent of PCTG. Other exemplary amounts include from 40 to 90 weight percent of PCTT, from 1 to 20 weight percent of PETG, and from 15 to 45 weight percent of PCTG. Yet other exemplary amounts include from 30 to 85 weight percent of PCTT, from 5 to 20 weight percent of PETG, and from 10 to 50 weight percent of PCTG. Yet other exemplary amounts include from 50 to 80 weight percent of PCTT, from 5 to 15 weight percent of PETG, and from 15 to 45 weight percent of PCTG. All of these exemplary concentrations are based on the sum of PCTT, PETG, and PCTG being equal to 100 weight percent. The relative amounts of PCTT, PETG, and PCTG may be adjusted within these general ranges according to the equations above to obtain the desired haze level in the resulting film.

In a preferred embodiment, the blend comprises 50 to 80 weight percent of the polyester PCTT, 5 to 15 weight percent of the polyester PETG, and 15 to 45 weight percent of the polyester PCTG.

For any embodiment of the invention, the diol component of the polyester PCTT may comprise from 15 to 45 mole percent of the residues of TMCD and from 55 to 85 mole percent of the residues of CHDM, from 15 to 40 mole percent of the residues of TMCD and from 60 to 85 mole percent of the residues of CHDM, from 15 to 30 mole percent of the residues of TMCD and from 70 to 85 mole percent of the residues of CHDM, from 20 to 30 mole percent of the residues of TMCD and from 70 to 80 mole percent of the residues of CHDM, or from 30 to 45 mole percent of the residues of TMCD and from 55 to 70 mole percent of the residues of CHDM.

For any embodiment of the invention, the diol component of the polyester PETG may comprise from 25 to 55 mole percent of the residues of CHDM and from 45 to 75 mole percent of the residues of EG, from 25 to 35 mole percent of the residues of CHDM and from 65 to 75 mole percent of the residues of EG, or from 45 to 55 mole percent of the residues of CHDM and from 45 to 55 mole percent of the residues of EG.

For any embodiment of the invention, the diol component of the polyester PCTG may comprise from 50 to 85 mole percent of the residues of CHDM and from 15 to 50 mole percent of the residues of EG, from 55 to 85 mole percent of the residues of CHDM and from 15 to 45 mole percent of the residues of EG, from 60 to 85 mole percent of the residues of CHDM and from 15 to 40 mole percent of the residues of EG, or from 55 to 70 mole percent of the residues of CHDM and from 30 to 45 mole percent of the residues of EG.

In a particularly preferred embodiment of the invention, the ternary polyester blend comprises:
(a) from 50 to 80 weight percent of a polyester (PCTT) comprising:
  (i) a diacid component comprising at least 95 mole percent of the residues of terephthalic acid; and (ii) a diol component comprising from 15 to 40 mole percent of the residues of 2,2,4,4-tetramethyl-1,3-cyclobutanediol and from 60 to 85 mole percent of the residues of 1,4-cyclohexanedimethanol;

(b) from 5 to 15 weight percent of a polyester (PETG) comprising:
(i) a diacid component comprising at least 95 mole percent of the residues of terephthalic acid; and
(ii) a diol component comprising from 25 to 35 mole percent of the residues of 1,4-cyclohexanedimethanol and from 65 to 75 mole percent of the residues of ethylene glycol; and (c) from 15 to 45 weight percent of a polyester (PCTG) comprising:
(i) a diacid component comprising at least 95 mole percent of the residues of terephthalic acid; and
(ii) a diol component comprising from 50 to 85 mole percent of the residues of 1,4-cyclohexanedimethanol and from 15 to 50 mole percent of the residues of ethylene glycol, wherein the weight percentages are based on the total amount of the polyesters PCTT, PETG, and PCTG in the blend, and the sum of the weight percentages equals 100, and wherein the blend has a haze value of 1.5% or less when measured on a 0.010-inch thick film.

In another preferred embodiment of the invention, the blend has a haze value of 1% or less. In yet another preferred embodiment of the invention, the blend has a haze value of 0.5% or less.

The haze values mentioned herein are quantified according to ASTM D1003 Method A, Illuminant C using a BYK Gardner Haze-Gard Plus. The haze values are generally measured on a 0.010-inch (0.254 mm) thick film sample.

The polyesters PCTT, PETG, and PCTG in the blends of the invention can have an inherent viscosity (IV) of 0.45 to 1.2 dL/g. In one embodiment, the polyesters PCTT, PETG, and PCTG have an IV of 0.55 to 0.76 dL/g. In one embodiment, the polyesters PCTT, PETG, and PCTG have an IV of 0.55 to 0.68 dL/g. In another embodiment, the polyesters PCTT, PETG, and PCTG have an IV of 0.65 to 0.78 dL/g. In another embodiment, the polyesters PCTT, PETG, and PCTG have an IV of 0.5 to 0.8 dL/g. In yet another embodiment, the polyesters PCTT, PETG, and PCTG have an IV of 0.55 to 0.70 dL/g.

The blends according to the invention can have an IV of 0.45 to 1.2 dL/g.

The IVs mentioned herein are measured at 25° C. using 0.5 grams of polymer per 100 mL of a solvent comprising 60 weight percent phenol and 40 weight percent tetrachloroethane.

As used herein, the terms "polyester" and "copolyester" are used interchangeably. The term "polyester" is intended to include "copolyesters" and is understood to mean a synthetic polymer prepared by the polycondensation of one or more difunctional carboxylic acids (or diacids) with one or more difunctional hydroxyl compounds (or diols). Typically, the difunctional carboxylic acid is a dicarboxylic acid and the difunctional hydroxyl compound is a dihydric alcohol such as, for example, glycols and diols.

The term "residue" means any organic structure incorporated into a polymer through a polycondensation reaction involving the corresponding monomer. The term "repeating unit" means an organic structure having a dicarboxylic acid residue (or diacid component) and a diol residue (or diol component) bonded through a carbonyloxy group. Thus, the dicarboxylic acid residues may be derived from a dicarboxylic acid monomer or its associated acid halides, esters, salts, anhydrides, or mixtures thereof.

Generally, the polyesters in the blends of the invention comprise dicarboxylic acid residues, diol residues, and, optionally, branching monomer residues. The polyesters contain substantially equal molar proportions of diacid residues (100 mole percent) and diol residues (100 mole percent), which react in substantially equal proportions such that the total moles of repeating units is equal to 100 mole percent. The mole percentages provided herein, therefore, are based on the total moles of diacid residues or the total moles of diol residues. For example, a polyester containing 20 mole percent of isophthalic acid residues, based on the total diacid residues, means the polyester contains 20 mole percent of isophthalic acid residues out of a total of 100 mole percent of diacid residues. In another example, a polyester containing 80 mole percent of 1,4-cyclohexanedimethanol residues, based on the total diol residues, means the polyester contains 80 mole percent of 1,4-cyclohexanedimethanol residues out of a total of 100 mole percent of diol residues.

The diacid component of the polyesters in the blends of the invention may contain up to 5 mole percent of the residues of a modifying dicarboxylic acid, if desired. In one embodiment, the modifying dicarboxylic acid can comprise aromatic dicarboxylic acids, other than terephthalic or isophthalic acids, containing 8 to 16 carbon atoms, cycloaliphatic dicarboxylic acids containing 8 to 16 carbon atoms, acyclic dicarboxylic acids containing 2 to 16 carbon atoms, or mixtures thereof. Examples of modifying dicarboxylic acids include malonic acid, succinic acid, glutaric acid, 1,3-cyclohexanedicarboxylic, 1,4-cyclohexanedicarboxylic acid, adipic acid, oxalic acid, suberic acid, sebacic acid, azelaic acid, dimer acid, pimelic acid, dodecanedioic acid, sulfoisophthalic acid, 2,6-decahydronaphthalenedicarboxylic acid, 4,4'-oxybenzoic acid, 3,3'- and 4,4'-stilbenedicarboxylic acid, 4,4'-dibenzyldicarboxylic acid, 1,4-, 1,5-, 2,3-, 2,6, and 2,7-naphthalenedicarboxylic acids, and combinations thereof. Where cis and trans isomers are possible, the pure cis or trans or a mixture of cis and trans isomers may be used.

The diol component of the polyesters in the blends of the invention may contain up to 5 mole percent of the residues of a modifying diol. Examples of modifying diols include propylene glycol, 1,3-propanediol, 2,4-dimethyl-2-ethylhexane-1,3-diol, 2,2-dimethyl-1,3-propanediol, diethylene glycol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, polyethylene glycol, diethylene glycol, polytetramethylene glycol, 2,2,4,4-tetramethyl-1,3-cyclobutanediol, and combinations thereof. The diol component may also contain minor amounts of degradation reaction products such as diethylene glycol.

The CHDM and TMCD residues in the polyesters of the invention may be derived from their pure cis or trans isomers, or from a mixture of their respective cis and trans isomers. For example, the mixture of CHDM or TMCD isomers may independently have a cis:trans molar ratio of 60:40 to 40:60. Other examples of cis:trans molar ratios include 70:30 to 30:70 and 80:20 to 20:80.

The polyesters in the blends of the invention may also independently contain a branching agent (or more precisely, a residue thereof). For example, the polyesters may each individually contain from 0.01 to 10 weight percent, or 0.1 to 1.0 weight percent, of the branching agent, based on the total weight percent of the respective polyesters. Conventional branching agents include polyfunctional acids, anhydrides, alcohols, and mixtures thereof. The branching agent may be a polyol having 3 to 6 hydroxyl groups, a polycarboxylic acid having 3 or 4 carboxyl groups, or a hydroxy acid having a total of 3 to 6 hydroxyl and carboxyl groups. Examples of such compounds include trimellitic acid or anhydride, trimesic acid, pyromellitic anhydride, trimethylolethane, trimethylolpropane, and the like.

The polyesters in the blends of the invention are commercially available. They may also be readily prepared from the appropriate dicarboxylic acids, esters, anhydrides, or salts, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The process may be advantageously operated as a continuous process for economic reasons and to produce superior coloration of the polymer as the polyester may deteriorate in appearance if allowed to reside in a reactor at an elevated temperature for too long.

The reaction of the diol and dicarboxylic acid may be carried out using conventional polyester polymerization conditions or by melt-phase processes, including melt-phase followed by solid-phase polycondensation techniques. For example, when preparing the polyester by an ester interchange reaction (i.e., from the ester form of the dicarboxylic acid components), the reaction process may comprise two steps. In the first step, the diol component and the dicarboxylic acid component, such as, for example, dimethyl terephthalate, are reacted at elevated temperatures, typically, 150° C. to 250° C. for 0.5 to 8 hours at pressures ranging from 0.0 kPa gauge to 414 kPa gauge (60 pounds per square inch, "psig"). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from 230° C. to 350° C. for 0.1 to 6 hours until a polymer having the desired degree of polymerization, as determined by inherent viscosity, is obtained. The polycondensation step may be conducted under reduced pressure ranging from 53 kPa (400 torr) to 0.013 kPa (0.1 torr). Stirring or appropriate conditions are used in both stages to ensure adequate heat transfer and surface renewal of the reaction mixture. The reaction rates of both stages can be increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ from 1.05 to 2.5 moles of the diol component to one mole of the dicarboxylic acid component. Persons of skill in the art will understand, however, that the ratio of the diol component to the dicarboxylic acid component is generally determined by the reactor design.

In preparing polyester by direct esterification (i.e., from the acid form of the dicarboxylic acid component), polyesters are produced by reacting the dicarboxylic acid or a mixture of dicarboxylic acids with the diol component or a mixture of diol components and the branching monomer component, if any. The reaction is generally conducted at a pressure of from 7 kPa gauge (1 psig) to 1379 kPa gauge (200 psig), preferably less than 689 kPa (100 psig) to produce a low molecular weight polyester product having an average degree of polymerization of 1.4 to 10. The temperatures employed during the direct esterification reaction typically range from 180° C. to 280° C., or more specifically from 220° C. to 270° C. This low molecular weight polymer may then be polymerized by a polycondensation reaction. Examples of the catalyst materials that may be used in the synthesis of the polyesters used in the present invention include titanium, manganese, zinc, cobalt, antimony, gallium, lithium, calcium, silicon and germanium. Such catalyst systems are described, for example, in U.S. Pat. Nos. 3,907,754, 3,962,189, 4,010,145, 4,356,299, 5,017,680, 5,668,243 and 5,681,918. For example, the catalyst may comprise titanium or titanium and manganese. The amount of catalytic metal may typically range from 5 to 100 ppm. In another example, titanium concentrations of 5 to 35 ppm can be used in order to provide polyesters having good color, thermal stability, and electrical properties. Phosphorus compounds can used in combination with the catalyst metals. Typically, up to 100 ppm of phosphorus may be used.

As noted above, the polyesters in the blends of the invention can be prepared with titanium-based catalysts. In the case of the PCTT polyester, the incorporation of TMCD can be further improved by using tin-based catalysts in addition to the titanium-based catalysts. Generally, the color of these polyesters can be improved by adding certain levels of phosphorus-containing compounds during polymerization. Therefore, in another embodiment of the invention, the PCTT polyester can comprise phosphorus atoms.

Phosphorus atoms can be added to the PCTT polyester as one or more phosphorus compounds. For example, phosphorus atoms can be added to the PCTT polyester as at least one alkyl phosphate ester, aryl phosphate ester, mixed alkyl aryl phosphate ester, diphosphite, salt of phosphoric acid, phosphine oxide, mixed alkyl aryl phosphite, reaction products thereof, or mixtures thereof. The phosphate esters include esters in which the phosphoric acid is fully esterified or only partially esterified. Some examples of alkyl, alky aryl, and aryl phosphate esters that can be added to the PCTT polyester include dibutylphenyl phosphate, triphenyl phosphate, tricresyl phosphate, tributyl phosphate, mixtures of tributyl phosphate and tricresyl phosphate, mixtures of isocetyl diphenyl phosphate and 2-ethylhexyl diphenyl phosphate, tri-2-ethylhexyl phosphate, trioctyl phosphate, MERPOL® A, or mixtures thereof. MERPOL® A is an ethoxylated phosphate nonionic surfactant commercially available from Stepan Chemical Co. The CAS Registry number for MERPOL® A is 37208-27-8.

The polyester blends of the invention may further comprise one or more additives in amounts that do not adversely affect the resulting blend properties such as haze. Examples of additives include antioxidants, melt strength enhancers, chain extenders, flame retardants, fillers, acid scavengers, dyes, colorants, pigments, anti-blocking agents, flow enhancers, impact modifiers, antistatic agents, processing aids, mold-release additives, plasticizers, slip agents, stabilizers, waxes, UV absorbers, optical brighteners, lubricants, pinning additives, foaming agents, nucleators, glass beads, metal spheres, ceramic beads, carbon black, cross-linked polystyrene or acrylic beads, and the like. Colorants, sometimes referred to as toners, may be added to impart a desired neutral hue and/or brightness to the polyester blends. Representative examples of fillers include calcium carbonate, talc, clay, mica, zeolites, wollastonite, kaolin, diatomaceous earth, $TiO_2$, $NH_4Cl$, silica, calcium oxide, sodium sulfate, and calcium phosphate.

Titanium dioxide and other pigments or dyes, may be included, for example, to control whiteness of films produced from the blend, or to make colored films.

The polyesters in the blends of the invention may comprise at least one chain extender. Suitable chain extenders include multifunctional (including bifunctional) isocyanates, multifunctional epoxides including, for example, epoxylated novolacs, and phenoxy resins. In certain embodiments, chain extenders may be added at the end of the polymerization process or after the polymerization process. If added after the polymerization process, chain extenders can be incorporated by compounding or by addition during article-forming processes such as, for example, injection molding or extrusion. The amount of chain extender used can vary depending on the specific monomer composition used and the physical properties desired. Generally, such amounts include 0.1 to 10 weight percent, based on the total weight of the blend.

The polyester blends of the invention can also contain non-polyester polymer components. Thus, another embodiment of the invention includes polyester blends, as described above, that further comprise up to 50 weight percent of a non-polyester polymer. Representative examples of the non-polyester polymers include polyamides, polyethers, polyolefins, polyacrylates and substituted polyacrylates, rubbers or elastomers, polycarbonates, polysulphones, polyphenyl sulphides, oxides, and ethers, polyketones, polyimides, halogenated polymers, organometallic polymers, water soluble polymers, carbohydrates, ionomers, styrenic copolymers, polyetherimides, polyphenyl oxides, urethanes, cyclic olefins, polyether etherketones, polyacetals, polyvinyl chlorides, alcohols, acetates, and the like.

The polyester blends of the invention may be prepared by melt blending or compounding the polyester components according to methods well-known to persons skilled in the art. The term "melt," as used herein, includes merely softening the polymers. The melt blending method includes blending the polymers at temperatures sufficient to melt the polyesters, typically from 200° to 300° C. The melt blending procedure may be performed in an agitated, heated vessel such as, for example, an extruder, an injection-molding machine, a two-roll mill, a planetary extruder, or a co-kneader. The blend may be cooled and pelletized for further use or the melt blend can be processed directly from this molten blend into film or other shaped articles by extrusion, calendering, thermoforming, blow-molding, extrusion blow-molding, injection molding, compression molding, casting, drafting, tentering, or blowing. For example, the polyesters PCTT, PETG, and PCTG, typically in pellet form, may be mixed together in a tumbler (along with any additives) and then placed in a hopper of an extruder for melt compounding. Alternatively, the pellets may be added to the hopper of an extruder by various feeders, which meter the pellets in their desired weight ratios.

To minimize hydrolysis or other degradation reactions during melt blending, the polyester components may be advantageously dried before being melt blended, for example, in the presence of a desiccant and/or in a forced air oven at elevated temperatures such as 70 to 150° C. for an extended period of time such as 1 to 12 hours.

In addition to melt-blending, the polyester blends can also be prepared by blending in solution. The solution-blending method includes dissolving the appropriate amounts of the polyesters in a suitable organic solvent such as methylene chloride or a 70:30 mixture of methylene chloride and hexafluoroisopropanol, mixing the solution, and separating the blend composition from solution by precipitation of the blend or by evaporation of the solvent. Solution-prepared blending methods are generally known in the polymers art.

In another aspect, the invention provides shaped articles comprising the polyester blends set forth herein. It should be understood that the shaped articles of the invention include the various embodiments of the polyester blends as described herein. The shaped articles can be produced by any method known in the art including extrusion, calendering, thermoforming, blow-molding, extrusion blow-molding, injection stretch blow-molding, injection molding, injection blow-molding, compression molding, profile extrusion, cast extrusion, melt-spinning, drafting, tentering, and blowing. The shaped articles can have a single layer or contain multiple layers. Multilayer articles can be prepared in which the polyester blends of the invention are present in one or more layers and one or more different polymeric materials are present in separate layers. Some non-limiting examples of shaped articles comprising the polyester blends of the invention include films, sheets, fibers, tubes, preforms, containers, and bottles. Other examples of shaped articles comprising the polyester blends of the invention include laminates, multi-layered films, multi-layered sheets, multi-component fibers, profiles, thermoforms, drape forms, and vacuum forms. For example, the shaped article can be an extruded article such as a film, sheet, or profile. In another example, the shaped article can be an injection molded part or component of a home appliance, electronic device, tool, automobile, medical device, and the like. In yet another example, the shaped article can be an injection molded jar, cosmetic article, decorative panel, or a component of a sign.

The polyester blends of the present invention may be fabricated into shaped articles such as, for example, films, by any technique known in the art. Formation of films can be achieved by melt extrusion, as described, for example, in U.S. Pat. No. 4,880,592; by compression molding as described, for example, in U.S. Pat. No. 4,427,614; or by any other suitable method. The polyester blends may be fabricated into mono-layer or multi-layer films by any technique known in the art. For example, mono-layer or multi-layer films may be produced by the well-known cast film, blown film, and extrusion coating techniques, the latter including extrusion onto a substrate. Representative substrates include films, sheets, and woven and nonwoven fabrics. Mono-layer or multi-layer films produced by melt casting or blowing can be thermally bonded or sealed to a substrate using an adhesive.

The polyester blends may be formed into a film using a conventional blown film apparatus. The film forming apparatus may be one referred to in the art as a "blown film" apparatus and includes a circular die head for bubble blown film through which the blend is forced and formed into a film "bubble." The "bubble" is ultimately collapsed and formed into a film.

The polyester blends may also be formed into films or sheets using any method known to those skilled in the art including, but not limited to, extrusion and calendering. In the extrusion process, the polyesters, typically in pellet form, are mixed together in a tumbler and then placed in a hopper of an extruder for melt compounding. Alternatively, the pellets may be added to the hopper of an extruder by various feeders, which meter the pellets in their desired weight ratios. Upon exiting the extruder, the polyester blend is shaped into a film. The shape of the film is not restricted in any way. For example, it may be a flat sheet or a tube. The film obtained may be stretched, for example, in a certain direction by 2 to 6 times the original dimensions.

The resulting film may be stretched by any of the methods known in the art such as, for example, the roll stretching method, long-gap stretching, the tenter-stretching method, and the tubular stretching method. With the use of any of these methods, it is possible to conduct biaxial stretching in succession, simultaneous biaxial stretching, uniaxial stretching, or a combination of these. Biaxial stretching in the machine direction and transverse direction may be done simultaneously or at different times by stretching first in one direction and then in the other direction.

In one embodiment, the polymer blends of the invention are useful in making calendered films or sheets on calendering rolls. The polymer blends also may comprise one or more plasticizers to increase the flexibility and softness of calendered polyester film, improve the processing of the polyester, and help to prevent sticking of the polyester to the calender rolls. The calendered films or sheets, typically, can have a thickness in the range of 2 mils (0.05 mm) to 80 mils (2 mm).

As mentioned above, the polyester blends of the invention may be used to form shaped articles through injection molding, injection blow-molding, extrusion blow molding, and injection stretch-blow molding. A typical injection molding process softens the polyester blend in a heated cylinder, injecting it while molten under high pressure into a closed mold, cooling the mold to induce solidification, and ejecting the molded preform from the mold. The preform with subsequent reheat and stretch-blow molding may be formed into a container or bottle.

The excellent transparency and low haze of the polyester blends of the invention enable the preparation of transparent, shaped articles with the incorporation of substantial amounts of scrap polymer or "regrind" from the shaped article forming process. Thus, one embodiment of the invention includes a shaped article that comprises any one of the polyester blends of the invention with, for example, 1 to 50 weight percent of recovered scrap from a shaped article forming process. The term "regrind" refers to scrap polymer that is recovered from an article forming process and ground into smaller particles.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered to be approximations. These values and ranges may vary from their stated numbers depending upon the desired properties sought to be obtained by the present invention as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90 and 70 to 80.

This invention can be further illustrated by the following working examples, although it should be understood that these examples are included merely for purposes of illustration and are not intended to limit the scope of the invention. Unless otherwise indicated or the context suggests differently, all percentages are by weight.

EXAMPLES

Various commercially-available polyester resins were melt blended in Examples 1-15 below. These materials have the characteristics shown in Table 1.

TABLE 1

| Resin Type | Resin | Diol Residue | | | Inherent Viscosity (dL/g) |
| --- | --- | --- | --- | --- | --- |
| | | EG (mol %) | CHDM (mol %) | TMCD (mol %) | |
| PCTT | A | 0 | 78 | 22 | 0.72 |
| PCTT | B | 0 | 78 | 22 | 0.63 |
| PETG | C | 69 | 31 | 0 | 0.75 |
| PETG | D | 69 | 31 | 0 | 0.59 |
| PCTG | E | 38 | 62 | 0 | 0.73 |
| PCTG | F | 19 | 81 | 0 | 0.75 |
| PCTT | G | 0 | 72 | 28 | 0.67 |
| PCTT | H | 0 | 65 | 35 | 0.64 |
| PCTG | I | 50 | 50 | 0 | 0.76 |
| PCTG | J | 38 | 62 | 0 | 0.63 |

In Table 1, "EG" refers to ethylene glycol, "CHDM" refers to 1,4-cyclohexanedimethanol, "TMCD" refers to 2,2,4,4-tetramethyl-1,3-cyclobutanediol. All resin products contain 100 mol % of terephthalic acid residues. The molar percentages shown above are approximations (within +/− about 2%), since degradation reactions in the reactor can produce byproducts including other diols such as DEG (diethylene glycol), which are subsequently incorporated into the polymer chain, and due to variability in the process control equipment.

The polyester inherent viscosities were determined in a 60/40 (wt/wt) phenol/tetrachloroethane solvent at a concentration of 0.5 g/100 ml at 25° C. as generally described in ASTM Method D2857-95.

Generally, the term "miscible" or "miscibility" in the context of polymer blends refers to blends that are a single-phase structure. In which case, a single glass transition temperature (Tg) by differential scanning calorimetry (DSC) will typically be observed. The term is used more broadly here, however. It includes blends with more than one Tg, but can produce films with sufficiently low haze so as to be considered "miscible." So the less the film is hazy; the more miscible is the blend.

Examples 1-15

In order to assess the miscibility of multi-component polyester blends, 0.010-inch thick films were extruded using various resin combinations described in Table 2 below. The film samples were made by drying the individual components separately, then mixing them at the extruder (a 2-inch non-vented Davis-Standard extrusion line with a L/D of 30:1). The extrusion conditions included a straight profile with temperature set point of about 520° F. (271° C.) at a production rate of approximately 150 pounds per hour. The materials were extruded through a 24-inch coat hanger die onto a 3-roll stack configuration. The roll temperatures were set to cool the sheet while minimizing stress. A mechanical issue prevented the top-cooling roll from being used, so the film samples were cast instead of being polished on both sides.

The film samples were then visually inspected to assess the presence of haze (a whitish cast or hue), which is an indication of an immiscible polymer blend. Haze was quantified in accordance with ASTM D1003 Method A, Illuminant C using a BYK Gardner Haze-Gard Plus. The average refractive index was measured with a 633-nm laser on a Metricon Model 2010 Prism Coupler. The glass transition temperatures (Tg) were determined using a TA Instruments 2950 differential scanning calorimeter (DSC) at a scan rate of 20° C./minute according to ASTM D3418. The readings were taken from the second DSC scan in order to remove heat history effects. The characteristics of the films extruded in Examples 1-15 are shown in Table 2 below.

TABLE 2

| Example No. | Resin A (wt %) | Resin B (wt %) | Resin C (wt %) | Resin D (wt %) | Resin E (wt %) | Haze (%) | Refractive Index | Tg1 (° C.) | Tg2 (° C.) |
|---|---|---|---|---|---|---|---|---|---|
| 1 | 100 | 0 | 0 | 0 | 0 | 0.30 | N/A | | |
| 2 | 95 | 0 | 5 | 0 | 0 | 3.30 | N/A | | |
| 3 | 90 | 0 | 10 | 0 | 0 | 6.21 | N/A | | |
| 4 | 80 | 0 | 20 | 0 | 0 | 14.5 | N/A | | |
| 5 | 0 | 95 | 0 | 5 | 0 | 0.94 | 1.5481 | 104.95 | N/A |
| 6 | 0 | 90 | 0 | 10 | 0 | 2.45 | 1.5490 | 82.06 | 104.45 |
| 7 | 0 | 85 | 0 | 15 | 0 | 3.77 | 1.5497 | 82.11 | 104.15 |
| 8 | 0 | 100 | 0 | 0 | 0 | 0.18 | 1.5477 | 106.82 | N/A |
| 9 | 0 | 50 | 0 | 5 | 45 | 0.19 | 1.5535 | 88.29 | 100.93 |
| 10 | 0 | 50 | 0 | 15 | 35 | 0.43 | 1.5532 | 85.72 | 101.41 |
| 11 | 0 | 60 | 0 | 10 | 30 | 0.42 | 1.5523 | 85.32 | 99.84 |
| 12 | 0 | 60 | 0 | 15 | 25 | 1.44 | 1.5524 | 84.86 | 100.20 |
| 13 | 0 | 70 | 0 | 5 | 25 | 0.36 | 1.5513 | 97.60 | N/A |
| 14 | 0 | 70 | 0 | 10 | 20 | 0.48 | 1.5511 | 84.38 | 100.85 |
| 15 | 0 | 80 | 0 | 5 | 15 | 0.36 | 1.5502 | 99.98 | N/A |

Figure 1:
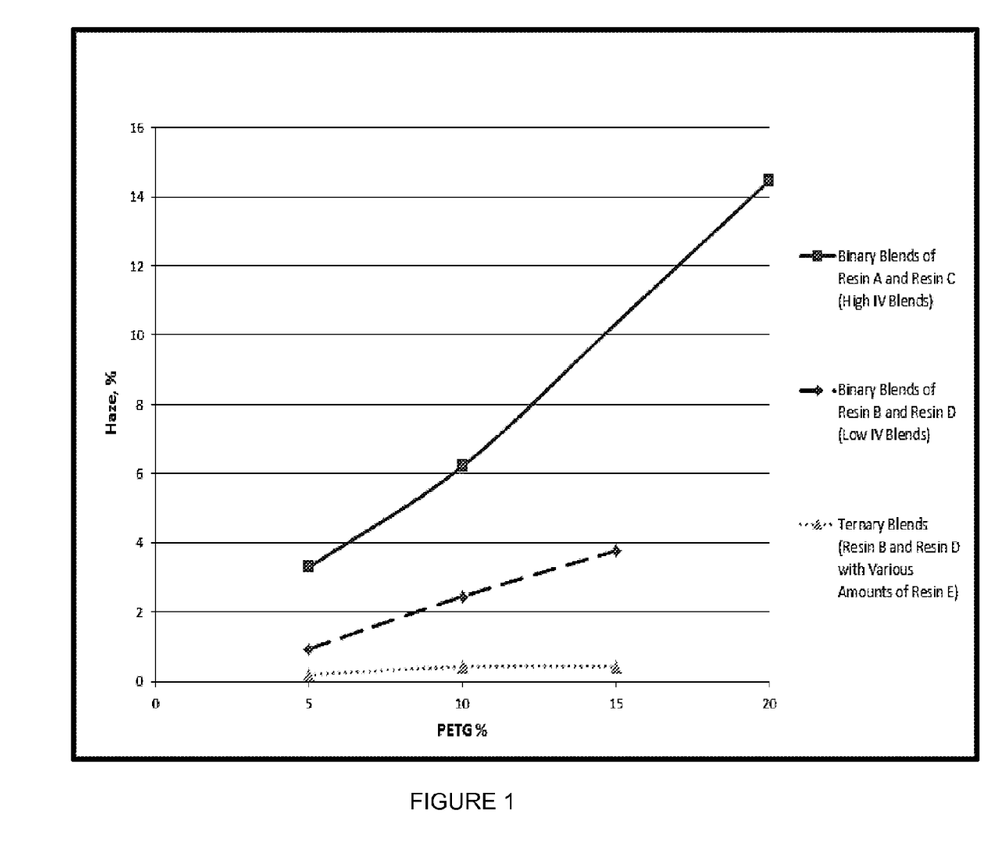
FIG. 1 is a graph of haze value versus the amount of PETG in the blends from Examples 1-15 below. Binary blends of Resin A and Resin C (high IV blends) wherein data points are represented by a square; binary blends of Resin B and Resin D (low IV blends) wherein data points are represented by a diamond; and ternary blends of Resin B, Resin D and varying amounts of Resin E wherein data points are represented by a triangle.

The results in Table 2 can be more easily interpreted by a plot as shown in FIG. 1. The solid line with square-shaped data markers in FIG. 1 shows that binary blends of Resin A and Resin C, both of which are polymers with relatively "high" inherent viscosities, do not form miscible blends as evidenced by excessive haze values ranging from just under 4% to just above 14%. The dashed line with diamond-shaped data markers, representing binary blends of Resin B and Resin D, show that the lower inherent viscosities of these two polymers form binary blends that are directionally more miscible than their counterparts with higher inherent viscosities with haze values ranging from about 1 to about 4% haze. Since many industrial applications that use clear films often require haze values less than 1%, a binary blend of Resin B and a Resin D may not suffice. The incorporation of at least some amount of Resin E will achieve the goal of keeping the haze below 1%. Specifically, haze values of about 0.2% to 0.5% were measured with most ternary blends as shown in the dotted line with triangle-shaped data markers.

Figure 2:
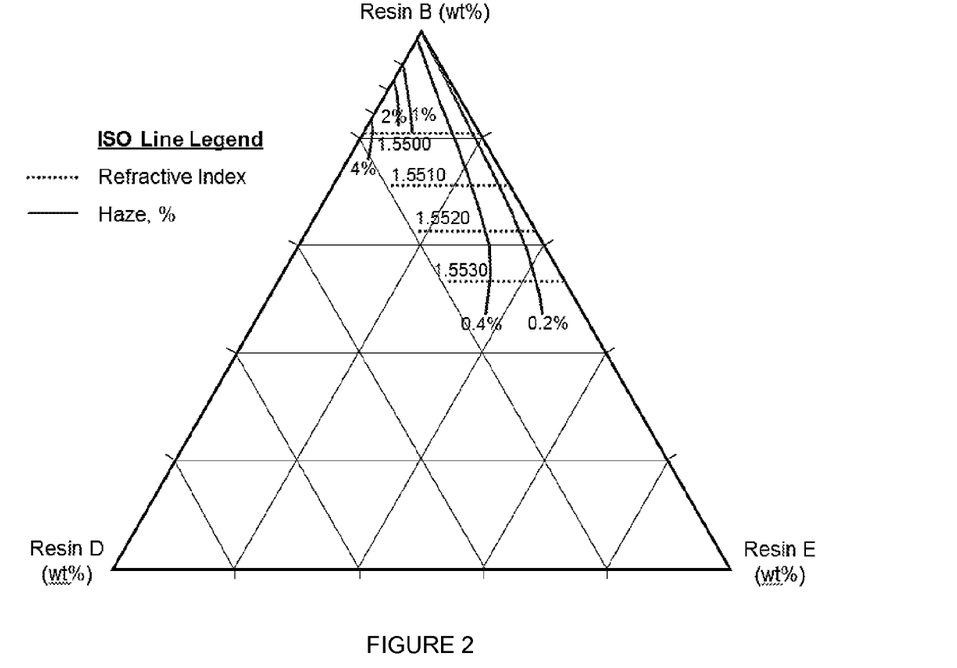
FIG. 2 is a ternary diagram of certain data from Table 2 below, wherein refractive index is represented by a dotted line and percent haze is represented by a solid line.

Although a Cartesian plot (FIG. 1) of data readily shows the benefit of improved (lower) haze with both lower inherent viscosities and the addition of a third component (Resin E), a ternary chart of the data in Table 2 as shown in FIG. 2 may be more informative to one skilled in the art. This type of chart will more readily show the effects of haze and refractive index changes with various ternary blends.

Statistical software using an algorithm for three-component mixtures can also be used to generate a model from the data in Table 2 as follows:

Haze=(0.00153506*Resin $B$)+(0.88801*Resin $D$)+(0.0564*Resin $E$)−(0.00757437*Resin $B$*Resin $D$)−(0.00067856*Resin $B$*Resin $E$)−(0.015113*Resin $D$*Resin $E$)

In the model, the haze is in percent and the resin values are in weight percent. The model above is sufficiently accurate for Resin B compositions above about 50 wt % and Resin D compositions below about 20 wt %.

Example 16

Prophetic

Repeat Examples 1-15, but replace Resin B with Resin G. Resin G is expected to be directionally less miscible than Resin B when coupled with Resins D and E due to both increasing chemical dissimilarity and its higher inherent viscosity. However, a region should exist on the ternary diagram where haze is low enough for commercial viability.

Example 17

Prophetic

Repeat Examples 1-15, but replace Resin B with Resin H. Resin H is expected to be directionally less miscible than Resin B when coupled with Resins D and E due to both increasing chemical dissimilarity and its higher inherent viscosity. However, a region should exist on the ternary diagram where haze is low enough for commercial viability.

Examples 18

Prophetic

Repeat Examples 1-15, but replace Resin B with Resin H, replace Resin D with Resin I, and replace Resin E with Resin F. The miscibility region in the resulting ternary diagram for polymer blends utilizing Resins F, H, and I is expected to be larger than the miscibility region for polymer blends utilizing Resins D, E, and H (Example 17) due to a relative increase in chemical similarity. However, the increase in the inherent viscosity of Resins F and I relative to Resins D and E is expected to hamper the increase in the miscibility region that is expected between Example 18 versus Example 17.

Example 19

Prophetic

Repeat Example 18, but replace Resin E with Resin J. Because the only difference between these two materials is that Resin J has a directionally lower inherent viscosity, the miscibility region in Example 19 is expected to be larger than that of Example 18.

Example 20

Prophetic

Repeat Examples 1-15, but increase the extruder zone temperatures by 20° F. This action is expected to directionally promote additional transesterification between the materials, thereby increasing miscibility (and decreasing haze).

In summary, when a binary combination of two polymers forms an immiscible blend, adding a third polymer, which is at least partially miscible in the binary combination with each of the other two materials separately, will tend to yield a blend with at least some region of improved miscibility on a ternary chart. This region of improved miscibility can be increased by performing one or more of the following steps:
1) decreasing the resin inherent viscosity;
2) changing the resin chemistry on one or more resins to make the materials more chemically-similar; and
3) increasing the temperature and/or residence time and/or catalytic system, etc., when the materials are melt blended to promote increasing levels of transesterification.

The invention has been described in detail with particular reference to preferred embodiments thereof, but it will be understood that variations and modifications can be effected within the spirit and scope of the invention.

We claim:

1. A ternary polyester blend comprising:
   (a) a polyester (PCTT) comprising:
      (i) a diacid component comprising at least 95 mole percent of the residues of terephthalic acid, isophthalic acid, or mixtures thereof; and
      (ii) a diol component comprising from 15 to 45 mole percent of the residues of 2,2,4,4-tetramethyl-1,3-cyclobutanediol and from 55 to 85 mole percent of the residues of 1,4-cyclohexanedimethanol;
   (b) a polyester (PETG) comprising:
      (i) a diacid component comprising at least 95 mole percent of the residues of terephthalic acid, isophthalic acid, or mixtures thereof; and
      (ii) a diol component comprising from 25 to 55 mole percent of the residues of 1,4-cyclohexanedimethanol and from 45 to 75 mole percent of the residues of ethylene glycol; and
   (c) a polyester (PCTG) comprising:
      (i) a diacid component comprising at least 95 mole percent of the residues of terephthalic acid, isophthalic acid, or mixtures thereof; and
      (ii) a diol component comprising from 60 to 85 mole percent of the residues of 1,4-cyclohexanedimethanol and from 15 to 40 mole percent of the residues of ethylene glycol,
   wherein said blend has a haze value of 5% or less when measured on a 0.010-inch thick film.

2. The blend according to claim 1, having a haze value of 1.5% or less when measured on a 0.010-inch thick film.

3. The blend according to claim 1, which comprises:
   (a) 40 to 90 weight percent of the polyester PCTT;
   (b) 1 to 20 weight percent of the polyester PETG; and
   (c) 15 to 45 weight percent of the polyester PCTG,
   wherein the weight percentages are based on the total amount of the polyesters PCTT, PETG, and PCTG in the blend, and the sum of the weight percentages equals 100.

4. The blend according to claim 1, wherein
   (a) the diol component of the polyester PCTT comprises from 15 to 30 mole percent of the residues of 2,2,4,4-tetramethyl-1,3-cyclobutanediol and from 70 to 85 mole percent of the residues of 1,4-cyclohexanedimethanol,
   (b) the diol component of the polyester PETG comprises from 25 to 35 mole percent of the residues of 1,4-cyclohexanedimethanol and from 65 to 75 mole percent of the residues of ethylene glycol
   (c) the diol component of the polyester PCTG comprises from 60 to 70 mole percent of the residues of 1,4-cyclohexanedimethanol and from 30 to 40 mole percent of the residues of ethylene glycol.

5. The blend according to claim 1, wherein
   (a) the diol component of the polyester PCTT comprises from 30 to 45 mole percent of the residues of 2,2,4,4-tetramethyl-1,3-cyclobutanediol and from 55 to 70 mole percent of the residues of 1,4-cyclohexanedimethanol,
   (b) the diol component of the polyester PETG comprises from 45 to 55 mole percent of the residues of 1,4-cyclohexanedimethanol and from 45 to 55 mole percent of the residues of ethylene glycol
   (c) the diol component of the polyester PCTG comprises from 60 to 85 mole percent of the residues of 1,4-cyclohexanedimethanol and from 15 to 40 mole percent of the residues of ethylene glycol.

6. The blend according to claim 1, wherein the polyesters PCTT, PETG, and PCTG have an inherent viscosity of 0.45 to 1.2 dL/g.

7. The blend according to claim 1, wherein the polyesters PCTT, PETG, and PCTG have an inherent viscosity of 0.55 to 0.76 dL/g.

8. The blend according to claim 1, wherein the polyesters PCTT, PETG, and PCTG have an inherent viscosity of 0.65 to 0.78 dL/g.

9. The blend according to claim 1, which has an inherent viscosity of 0.45 to 1.2 dL/g.

10. The blend according to claim 1, wherein the polyesters PCTT, PETG, and PCTG are present in an amount sufficient to satisfy equations (1a) or (1b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0.41 \quad (1a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 1.22 \quad (1b)$$

wherein X is the weight percent of the polyester PCTT, Y is the weight percent of the polyester PETG, and Z is the weight percent of the polyester PCTG in the polyester blend.

11. The blend according to claim 1, wherein the polyesters PCTT, PETG, and PCTG are present in an amount sufficient to satisfy equations (2a) or (2b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0 \quad (2a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 1 \quad (2b)$$

wherein X is the weight percent of the polyester PCTT, Y is the weight percent of the polyester PETG, and Z is the weight percent of the polyester PCTG in the polyester blend.

12. The blend according to claim 1, wherein the polyesters PCTT, PETG, and PCTG are present in an amount sufficient to satisfy equations (3a) or (3b):

$$(-0.02276*X)+(-0.02273*Y)+(-0.01537*Z)+ \\ (0.003789*X*Y)+(6.52\times10^{-5}*X*Z)+(5.7\times \\ 10^{-5}*Y*Z)+(-6.7\times10^{-5}*X*Y*Z) \leq 0.7 \quad (3a)$$

$$(0.005331*X)+(0.005345*Y)+(0.00507*Z)+ \\ (0.002287*X*Y)+(-4.9\times10^{-5}*X*Z)+(-5.3\times \\ 10^{-5}*Y*Z)+(-3.1\times10^{-5}*X*Y*Z) \leq 0.7 \quad (3b)$$

wherein X is the weight percent of the polyester PCTT, Y is the weight percent of the polyester PETG, and Z is the weight percent of the polyester PCTG in the polyester blend.

13. A shaped article comprising the polyester blend according to claim 1.

14. The shaped article according to claim 13, which is a film, sheet, fiber, tube, preform, container, or bottle.

15. The shaped article according to claim 13, which is a laminate, multi-layered film, multi-layered sheet, or multi-component fiber.

16. A ternary polyester blend comprising:
(a) from 50 to 80 weight percent of a polyester (PCTT) comprising:
    (i) a diacid component comprising at least 95 mole percent of the residues of terephthalic acid; and
    (ii) a diol component comprising from 15 to 40 mole percent of the residues of 2,2,4,4-tetramethyl-1,3-cyclobutanediol and from 60 to 85 mole percent of the residues of 1,4-cyclohexanedimethanol;
(b) from 5 to 15 weight percent of a polyester (PETG) comprising:
    (i) a diacid component comprising at least 95 mole percent of the residues of terephthalic acid; and
    (ii) a diol component comprising from 25 to 35 mole percent of the residues of 1,4-cyclohexanedimethanol and from 65 to 75 mole percent of the residues of ethylene glycol; and
(c) from 15 to 45 weight percent of a polyester (PCTG) comprising:
    (i) a diacid component comprising at least 95 mole percent of the residues of terephthalic acid; and
    (ii) a diol component comprising from 50 to 85 mole percent of the residues of 1,4-cyclohexanedimethanol and from 15 to 50 mole percent of the residues of ethylene glycol,
wherein the weight percentages are based on the total amount of the polyesters PCTT, PETG, and PCTG in the blend, and the sum of the weight percentages equals 100, and
wherein the blend has a haze value of 1.5% or less when measured on a 0.010-inch thick film.

17. The blend according to claim 16, wherein the diol component of the polyester PCTT comprises from 20 to 30 mole percent of the residues of 2,2,4,4-tetramethyl-1,3-cyclobutanediol and from 70 to 80 mole percent of the residues of 1,4-cyclohexanedimethanol.

18. The blend according to claim 16, wherein the diol component of the polyester PCTG comprises from 60 to 85 mole percent of the residues of 1,4-cyclohexanedimethanol and from 15 to 40 mole percent of the residues of ethylene glycol.

19. A ternary blend comprising:
(a) 40 to 90 weight percent of a polyester (PCTT) comprising:
    (i) a diacid component comprising at least 95 mole percent of the residues of terephthalic acid, isophthalic acid, or mixtures thereof; and
    (ii) a diol component comprising from 15 to 45 mole percent of the residues of 2,2,4,4-tetramethyl-1,3-cyclobutanediol and from 55 to 85 mole percent of the residues of 1,4-cyclohexanedimethanol;
(b) 1 to 20 weight percent of a polyester (PETG) comprising:
    (i) a diacid component comprising at least 95 mole percent of the residues of terephthalic acid, isophthalic acid, or mixtures thereof; and
    (ii) a diol component comprising from 25 to 55 mole percent of the residues of 1,4-cyclohexanedimethanol and from 45 to 75 mole percent of the residues of ethylene glycol; and
(c) 10 to 50 weight percent of a polyester (PCTG) comprising:
    (i) a diacid component comprising at least 95 mole percent of the residues of terephthalic acid, isophthalic acid, or mixtures thereof; and
    (ii) a diol component comprising from 60 to 85 mole percent of the residues of 1,4-cyclohexanedimethanol and from 15 to 40 mole percent of the residues of ethylene glycol,
wherein the weight percentages are based on the total amount of the polyesters PCTT, PETG, and PCTG in the blend, and the sum of the weight percentages equals 100.

20. The ternary blend of claim 19 comprising:
(a) 50 to 80 weight percent of the polyester PCTT;
(b) 5 to 15 weight percent of the polyester PETG; and
(c) 15 to 45 weight percent of the polyester PCTG,
wherein the weight percentages are based on the total amount of the polyesters PCTT, PETG, and PCTG in the blend, and the sum of the weight percentages equals 100.

21. The ternary blend of claim 19 comprising:
(a) a polyester PCTT comprising from 30 to 45 mole percent of the residues of 2,2,4,4-tetramethyl-1,3-cyclobutanediol and from 55 to 70 mole percent of the residues of 1,4-cyclohexanedimethanol,
(b) a polyester PETG comprises from 45 to 55 mole percent of the residues of 1,4-cyclohexanedimethanol and from 45 to 55 mole percent of the residues of ethylene glycol; and
(c) a polyester PCTG comprises from 60 to 85 mole percent of the residues of 1,4-cyclohexanedimethanol and from 15 to 40 mole percent of the residues of ethylene glycol.

22. The ternary blend of claim 20 comprising:
(a) a polyester PCTT comprising from 30 to 45 mole percent of the residues of 2,2,4,4-tetramethyl-1,3-cyclobutanediol and from 55 to 70 mole percent of the residues of 1,4-cyclohexanedimethanol,
(b) a polyester PETG comprises from 45 to 55 mole percent of the residues of 1,4-cyclohexanedimethanol and from 45 to 55 mole percent of the residues of ethylene glycol; and
(c) a polyester PCTG comprises from 60 to 85 mole percent of the residues of 1,4-cyclohexanedimethanol and from 15 to 40 mole percent of the residues of ethylene glycol.

23. The blend according to claims 16, 19, 20, 21 or 22, having a haze value of 1% or less when measured on a 0.010-inch thick film.

24. The blend according to claims 16, 19, 20, 21 or 22, having a haze value of 0.5% or less when measured on a 0.010-inch thick film.

25. The blend according to claims 16, 19, 20, 21 or 22, wherein the polyesters PCTT, PETG, and PCTG have an inherent viscosity of 0.5 to 0.8 dL/g.

26. The blend according to claims 16, 19, 20, 21 or 22, wherein the polyesters PCTT, PETG, and PCTG have an inherent viscosity of 0.55 to 0.70 dL/g.

27. A shaped article comprising the polyester blend according to claims 16, 19, 20, 21 or 22.

28. The shaped article according to claim 27, which is a film, sheet, fiber, tube, preform, container, or bottle.

* * * * *